(12) United States Patent
Hiasa (10) Patent No.: US 7,952,893 B2
(45) Date of Patent: May 31, 2011

(54) INTEGRATED CONTROL CIRCUIT FOR CONTROLLING A SWITCHING POWER SUPPLY, SWITCHING POWER SUPPLY INCORPORATING THE SAME, AND A METHOD OF CONTROLLING A SWITCHING POWER SUPPLY

(75) Inventor: Nobuyuki Hiasa, Matsumoto (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 476 days.

(21) Appl. No.: 12/033,720

(22) Filed: Feb. 19, 2008

(65) Prior Publication Data
US 2011/0103101 A1    May 5, 2011

(30) Foreign Application Priority Data
Feb. 19, 2007   (JP) ................. 2007-038316

(51) Int. Cl.
*H02M 3/335*    (2006.01)
*H02H 7/122*    (2006.01)
(52) U.S. Cl. ............... 363/21.01; 363/56.01; 363/97
(58) Field of Classification Search ............ 363/20, 363/21.01, 50, 55, 97, 56.01, 95
See application file for complete search history.

(56) References Cited

U.S. PATENT DOCUMENTS

| | | | | |
|---|---|---|---|---|
| 5,973,942 | A * | 10/1999 | Nelson et al. ............. | 363/21.01 |
| 7,049,879 | B2 * | 5/2006 | Osamura et al. ............ | 327/419 |
| 7,359,225 | B2 * | 4/2008 | Djenguerian et al. ......... | 363/97 |
| 7,778,049 | B2 * | 8/2010 | Morota ..................... | 363/21.12 |

FOREIGN PATENT DOCUMENTS

| | | |
|---|---|---|
| JP | 11-215690 | 8/1999 |
| JP | 11-234892 | 8/1999 |

* cited by examiner

*Primary Examiner* — Adolf Berhane
(74) *Attorney, Agent, or Firm* — Rabin & Berdo, PC (57) ABSTRACT

An integrated control circuit for controlling a switching power supply, a switching power supply incorporating the same, and a method of controlling the switching power supply, where the control IC includes a current comparator that detects current flowing through a switching device, a flip-flop circuit that controls the ON-period of the switching device, an averaging circuit that converts the peak load current value to a time-average, a comparator that detects an overloaded state from the load current, a delay circuit that sets a time from detecting the overcurrent state to stopping the switching operation, a latch circuit that stops the switching operation for a period of time, a first reference voltage supply used in the current comparator, which has a higher voltage value than a second reference voltage supply used in the comparator.

17 Claims, 5 Drawing Sheets

INTEGRATED CONTROL CIRCUIT FOR CONTROLLING A SWITCHING POWER SUPPLY, SWITCHING POWER SUPPLY INCORPORATING THE SAME, AND A METHOD OF CONTROLLING A SWITCHING POWER SUPPLY

FIELD OF THE INVENTION

The present invention relates to an integrated control circuit for controlling a switching power supply, which includes a switching device connected to the primary winding of a transformer, and to the switching power supply (hereinafter the integrated control circuit for controlling the switching power supply will be referred to as the "control IC".) In slightly greater detail, the control IC controls the switching operation of the switching device to feed the predetermined electric power from the transformer secondary winding to a load. Specifically, the present invention relates to a control IC that exhibits a current limiting function, an overcurrent protection function and an overload protection function to protect the component parts of the switching power supply, and also relates to such a protection function, and to the switching power supply that exhibits the functions described above.

BACKGROUND OF THE INVENTION

The switching power supply, and the control IC for controlling the switching power supply, are provided with a current limiting function, an overcurrent protection function, an overload protection function, and such protection functions prevent components thereof, such as a power MOSFET, a diode and an inductor from breakdown.

Figure 4:
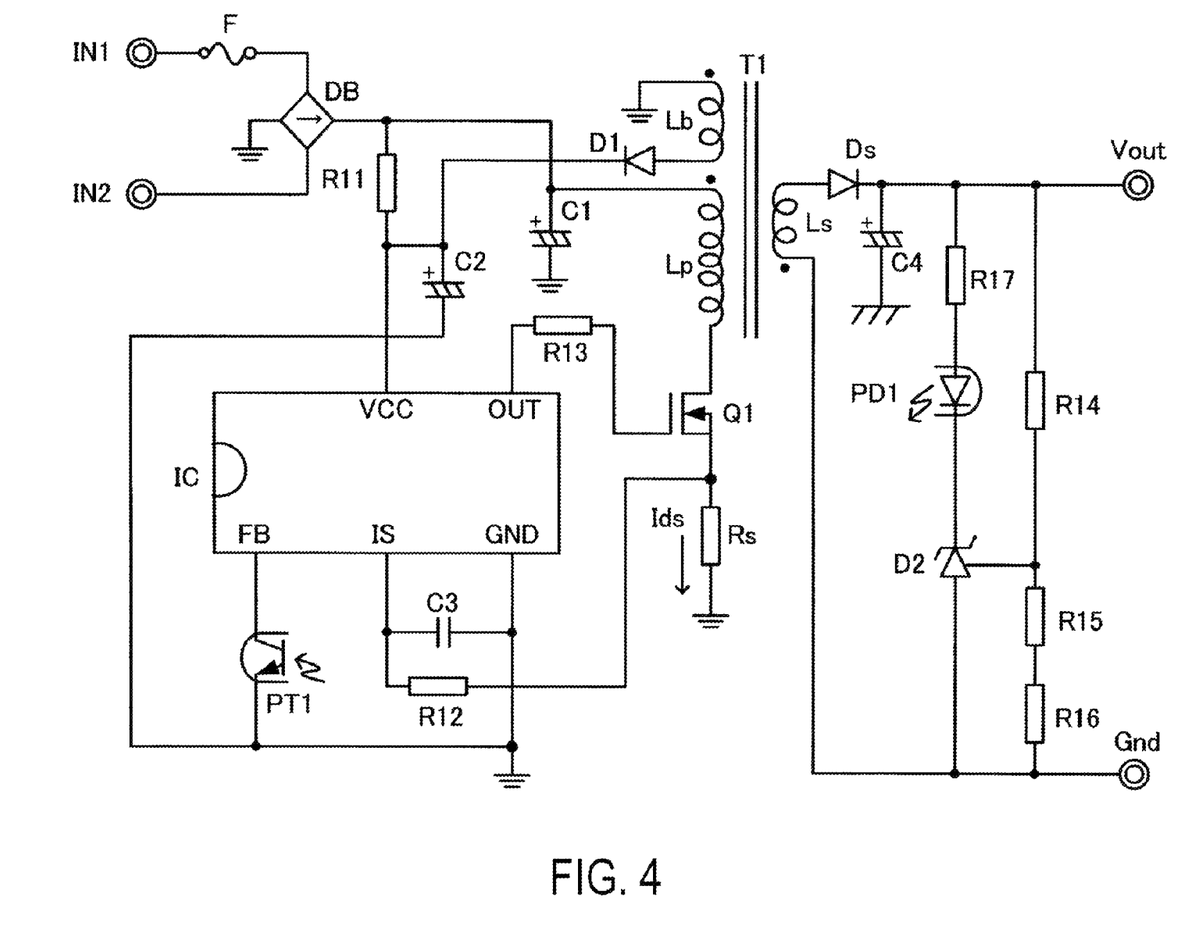
FIG. 4 is a circuit diagram showing the circuit configuration of a power supply of an insulation type that employs a transformer for electric power conversion.
Figure 5:
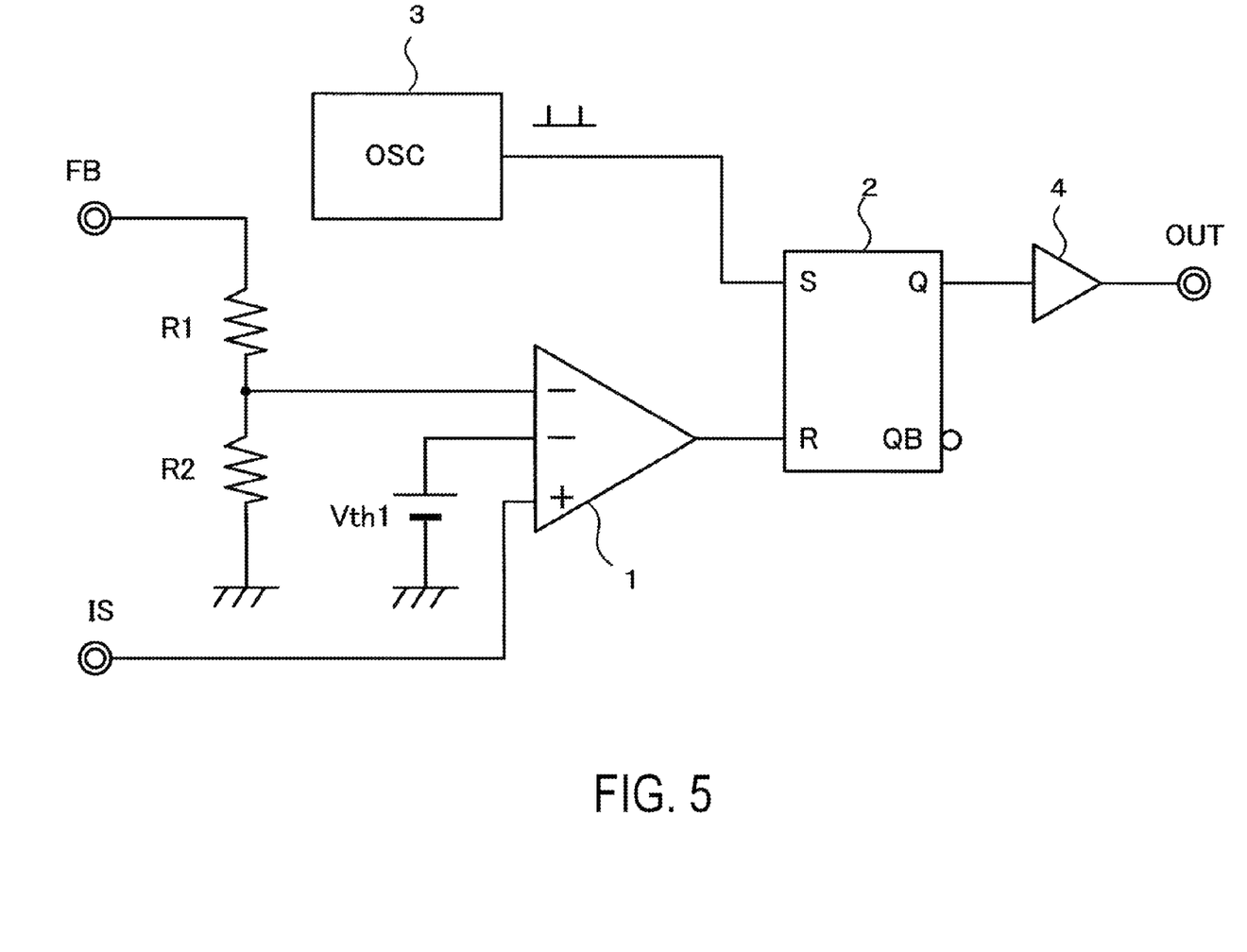
FIG. 5 is a block circuit diagram of a conventional control IC for controlling a switching power supply.

FIG. 4 is a circuit diagram showing the circuit configuration of a power supply of an insulation type that employs a transformer for electric power conversion. FIG. 5 is a block circuit diagram of a conventional control IC for controlling a switching power supply. AC power supply input terminals IN1 and IN2 are shown in FIG. 4. Diode bridge DB is connected to input terminals IN1 and IN2 via fuse F. The rectified DC electric power is fed to the first end of primary winding Lp of transformer T1 from the DC output terminal of diode bridge DB. The second end of primary winding Lp is connected to the drain of switching device Q1 that is a power MOSFET and such a power semiconductor device. The source of switching device Q1 is grounded via sensing resistor Rs. Smoothing capacitor C1 is connected to the DC output terminal of diode bridge DB in parallel with a series circuit consisting of primary winding Lp, switching device Q1 and sensing resistor Rs.

Auxiliary winding Lb is disposed on the side of primary winding Lp in transformer T1. Rectifying diode D1 and smoothing capacitor C2 are connected to auxiliary winding Lb. The connection point of rectifying diode D1 and smoothing capacitor C2 is connected to the DC output terminal of diode bridge DB via resistor 11. Power supply Vcc is fed to the control IC via the connection point.

Generally, the control IC is provided with a plurality of external terminals (pins). The control IC in FIG. 4 includes input terminal FB as a first pin, to which a feedback voltage $V_{FB}$ is inputted, sensing input terminal IS as a second pin, to which a voltage signal Vis is fed, ground terminal GND as a third pin that feeds a reference voltage to each section in the control IC, output terminal OUT as a fourth pin, from which a control signal is outputted to switching device Q1, and power supply terminal VCC as a fifth pin, from which electric power is fed to the control IC. Where the control IC package has eight pins, the pins which exhibit terminal functions other than those described above include a pin employed as an input terminal for detecting zero current, a pin employed as a terminal for feeding a starting current, and a pin employed as an unconnected terminal.

The collector terminal of phototransistor PT1, which constitutes a photocoupler, is connected to input terminal FB, to which feedback voltage $V_{FB}$ is fed. The emitter terminal of phototransistor PT1 is grounded. Sensing input terminal IS, to which voltage signal Vis is fed, is connected to the first end of resistor R12 and the first end of capacitor C3. The second end of resistor R12 is connected to the connection point of switching device Q1 and sensing resistor Rs. The second end of capacitor C3 is grounded. Voltage signal Vis, which is proportional to drain-source current Ids flowing through switching device Q1, is inputted to sensing input terminal IS of the control IC. A PWM signal is outputted from output terminal OUT to switching device Q1 via resistor 13.

DC output terminal Vout is disposed on the secondary side of transformer T1, with a rectifying circuit interposed between secondary winding Ls and DC output terminal Vout. The rectifying circuit includes diode Ds and smoothing capacitor C4 and rectifies the voltage generated across secondary winding Ls. The anode of diode Ds is connected to the first end of secondary winding Ls. The cathode of diode Ds is connected to DC output terminal Vout and to the first end of smoothing capacitor C4. The second end of smoothing capacitor C4 is grounded. The second end of secondary winding Ls is connected to ground terminal Gnd. A load circuit (not-shown) is connected between DC output terminal Vout and ground terminal Gnd. A series circuit, consisting of three resistors R14, R15 and R16, and an output detection circuit, consisting of resistor R17, photodiode PD1 and shunt regulator D2, are connected between DC output terminal Vout and ground terminal Gnd. Photodiode PD1 constitutes the photocoupler.

The control IC that controls the power supply described above will now be described below with reference to FIG. 5. Only the first pin employed as input terminal FB, the second pin employed as sensing input terminal IS and the fourth pin employed as output terminal VOUT are shown in FIG. 5.

Input terminal FB is grounded via a resistance circuit consisting of resistors R1 and R2 connected in series with each other. The connection point of resistors R1 and R2 is connected to the first (−) input terminal of current comparator 1, which also exhibits an overcurrent limiting function. Current comparator 1 constitutes a comparator circuit having three input terminals. The second (−) input terminal of current comparator 1 is connected to reference voltage supply Vth1. The third (+) input terminal of current comparator 1 is connected to sensing input terminal IS, from which voltage signal Vis is fed. The output terminal of current comparator 1 is connected to reset terminal R of flip-flop circuit 2, and the output terminal of oscillator circuit (OSC) 3 is connected to set terminal S of flip-flop circuit 2. The output from terminal Q of flip-flop circuit 2 is subjected to impedance conversion by buffer circuit 4 and outputted from output terminal VOUT as a switching signal for switching device Q1, e.g. a power MOSFET connected externally to the control IC.

The control IC drives the gate of switching device Q1 by switching the potential of output terminal VOUT between the high (H) level and the low (L) level, such that the power supply generates a smoothed DC voltage, smoothed on the secondary side of transformer T1, between output terminal Vout and ground terminal Gnd. As a drain current flows through switching device Q1 during the ON-period thereof, a current flows through primary winding Lp on the primary side of transformer T1, connected to switching device Q1, and the current value increases, storing energy in transformer T1. Although switching device Q1 is turned off subsequently, the energy stored in transformer T1 causes a current to flow to smoothing capacitor C4 through diode Ds on the secondary side of transformer T1 during the OFF-period of switching device Q1. Thus, a smoothed DC voltage, smoothed on the secondary side of transformer T1, is generated between power-supply output-terminal Vout and ground terminal Gnd. The drain-source current Ids of switching device Q1 on the primary side of transformer T1 is converted to a voltage by sensing resistor Rs. The converted voltage is inputted as voltage signal Vis to sensing input terminal IS of the control IC. In current comparator 1, to which voltage signal Vis is inputted, a first comparison is conducted between the voltage value of reference voltage supply Vth1 and the divided voltage signal obtained by dividing the feedback voltage $V_{FB}$ with resistors R1 and R2 as shown in FIG. 5. In addition, a second comparison is conducted between voltage signal Vis and the lower one of the voltage value of reference voltage supply Vth1 and the divided voltage signal. The result of the second comparison is outputted to flip-flop 2.

When voltage signal Vis is compared with the divided voltage signal of feedback voltage $V_{FB}$, the comparison is conducted to control the output voltage from the power supply to be at a constant value. When voltage signal Vis is compared with the voltage value of reference voltage Vth1, the conversion is conducted to detect a peak current.

A voltage signal is generated across the series resistance circuit consisting of resistors R14, R15 and R16. This voltage signal is generated corresponding to the current flowing through the load (not-shown) connected between DC output terminal Vout and ground terminal Gnd (in other words, the voltage signal is generated according to the load weight). A current corresponding to the voltage signal therefore flows through photodiode PD1 in the output detection circuit. Hence, it is possible to feed feedback voltage $V_{FB}$ to phototransistor PT1 connected to input terminal FB of the control IC. Feedback voltage $V_{FB}$ corresponds to the load current variation caused in the load circuit. In detail, as the current flowing through the load circuit increases, the electric charge discharged from smoothing capacitor C4 increases. As the output voltage of the power supply (the voltage across capacitor C4) is reduced, feedback voltage $V_{FB}$ rises. In contrast, as the current flowing through the load circuit decreases, the electric charge discharged from smoothing capacitor C4 decreases. As the output voltage from the power supply (the voltage across capacitor C4) rises, feedback voltage $V_{FB}$ is reduced.

The control IC compares voltage signal Vis inputted thereto with the voltage value of reference voltage supply Vth1. The control IC stops the switching operation when a current higher than the threshold value flows through switching device Q1 on the primary side of transformer T1. Thus, the control IC prevents an overcurrent from flowing through the component parts of the power supply in every switching cycle. The control method described above is called "current limitation control of pulse-by-pulse type".

The control IC exhibits a latching function for latching the PWM signal output to switching device Q1 to stop switching device Q1 when the current limitation function described above continues for a certain period. The control IC also exhibits an automatic restart function to automatically resume switching operation of the switching device Q1 after the latch is removed.

When the load circuit connected to the switching power supply as described above is an inductive load, through which a high current flows only at the start, a large difference arises between the average load current and the peak load current. To protect the switching operation in such a case as described above, it is necessary to set two reference voltages, based on which the average load current and the peak current are monitored independently.

As the average load current is detected outside the conventional control IC, the detection circuit for detecting the average load current is not described herein. The result of comparing the average load current with the protection operation reference is often synthesized with the feedback signal for the PWM control. The feedback signal for the PWM control is prepared from the output voltage on the secondary side of the power supply. Then, the synthesized signal is inputted to input terminal FB of the control IC.

The current flowing through switching device Q1 is proportional to the output current on the secondary side. Therefore, the overcurrent protection apparatus disclosed in the Unexamined Japanese Patent Application Publication No. Hei.11 (1999)-215690 (Paragraphs [0015] through [0026], FIG. 4) detects an overcurrent by employing current detection circuit 11 on the primary side when the current value detected by current detection resistor $R_{SP}$ exceeds maximum current value I2 on the secondary side. When current detection circuit 11 detects an overcurrent, the overcurrent protection apparatus disclosed therein limits the output current by the PWM control. Current detection circuit 12 on the secondary side compares the current value detected by resistor $R_{SS}$ with current value I1 defined as an average current quantity. When the detected current value exceeds current value I1, pulse-width detection circuit 13 operates. As the output from pulse-width detection circuit 13 is inverted, the overcurrent protection apparatus disclosed in the Unexamined Japanese Patent Application Publication No. Hei.11 (1999)-215690 judges that the detection signal from current detection circuit 12 is inputted continuously for a period longer than the predetermined time width and limits the output current by the PWM control. As described above, the overcurrent protection apparatus disclosed therein directly monitors the load current with current detection circuit 12 on the secondary side. The overcurrent protection apparatus feeds back the averaged signal to the control section of switching device Q1 to conduct the protection operation. The overcurrent protection apparatus disclosed therein also monitors the overcurrent caused through switching device Q1 with current detection circuit 11 on the primary side. The overcurrent protection apparatus feeds back the monitored overcurrent to the control section of switching device Q1 to conduct the protection operation (in this paragraph, the reference numerals and symbols described in FIG. 4 of the Unexamined Japanese Patent Application Publication No. Hei.11 (1999)-215690 are employed).

Unexamined Japanese Patent Application Publication No. Hei.11 (1999)-234892 (Paragraphs [0022] through [0044], FIGS. 4 through 1) discloses an overcurrent protection apparatus that includes an overcurrent detection circuit for measuring the output current on the secondary side. The overcurrent protection apparatus disclosed therein starts a controlled protection operation when the detection signal from the overcurrent detection circuit exceeds the threshold value for a certain period.

As the component parts for monitoring the load current on the secondary side are additional in the conventional power supply that includes the detection circuits disclosed in the Unexamined Japanese Patent Application Publication No. Hei.11 (1999)-215690 or Unexamined Japanese Patent Application Publication No. Hei.11 (1999)-234892, it is difficult to realize the conventional power supplies disclosed in these references as inexpensive products. As the volume of the power supplies disclosed in the these references is increased relative to conventional power supplies, it is not preferable to incorporate such power supplies into small electronic instruments.

In view of the foregoing, it would be desirable to provide a control IC for controlling a switching power supply that facilitates reducing the number of component parts, the volume of the power supply, and the manufacturing costs of the power supply. It would be also desirable to provide a switching power supply that facilitates reducing the number of component parts, the volume of the power supply, and the manufacturing costs thereof.

SUMMARY OF THE INVENTION

According to an aspect of the invention, an integrated control circuit controlling a switching power supply is provided, the integrated control circuit making the switching device connected to a transformer primary winding conduct a switching operation for feeding the predetermined electric power from a transformer secondary winding to a load, the integrated control circuit including a current limiting means detecting the current flowing through the switching device in every switching cycle for controlling the ON-period of the switching device; an overload or overcurrent protecting means, the protecting means detecting, from the load current flowing through the load, the overcurrent state of the load or the overloaded state of the load, for stopping the switching operation of the switching device for a certain period of time; a delay means setting a delay time from detecting the overcurrent state or the overloaded state of the load to stopping the switching operation of the switching device; a first detection level used in the current limiting means; and a second detection level used in the protecting means; the first detection level being set to be higher than the second detection level.

The integrated control circuit (control IC) according to a preferred embodiment of the invention monitors the average current based on the feedback signal for controlling the output voltage, compares the average current with the reference voltage for the protection operation conducted by the protecting means against an overload or an overcurrent, and latches the PWM signal output to the switching device when the average current keeps its overcurrent state for a certain period, to stop the switching operation of the switching device.

According to a preferred embodiment of the invention, the peak current limiting function and the over average current protection function are realized simultaneously by the same control IC, while the manufacturing costs of the control IC and the volume of the switching power supply are prevented from increasing. The control IC according to the invention facilitates setting the limitations for the average current and the peak current respectively even in driving an inductive load, in which a large difference arises between the peak current and the average current.

DETAILED DESCRIPTION OF THE PREFERRED EMBODIMENTS

The invention will now be described in detail hereinafter with reference to the accompanied drawings, which illustrate the preferred embodiments of the invention.

First Embodiment

Figure 1:
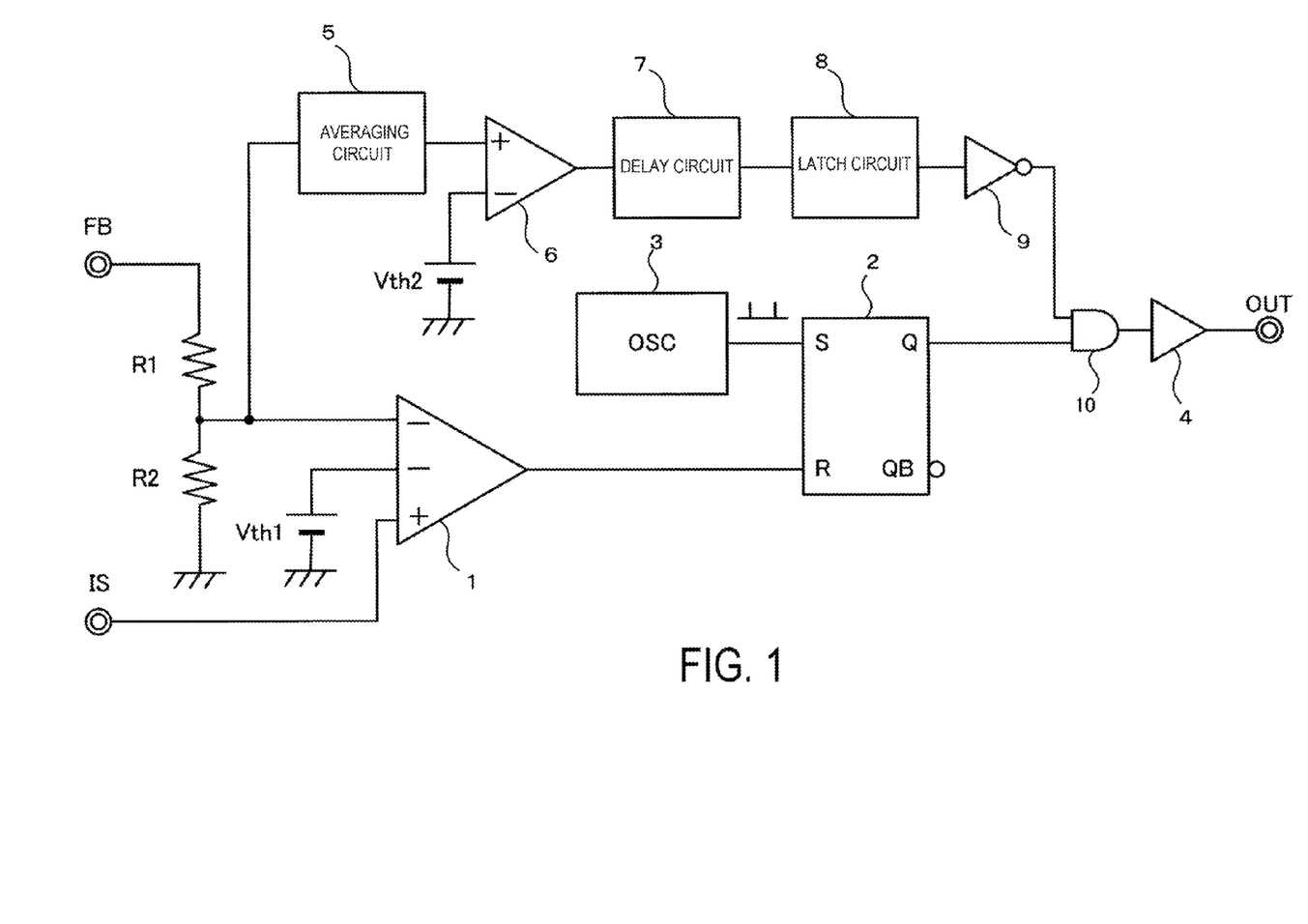
FIG. 1 is a block circuit diagram of a control IC for controlling a switching power supply according to a first embodiment of the invention.

FIG. 1 is a block circuit diagram of a control IC for controlling a switching power supply according to a first embodiment of the invention. The control IC shown in FIG. 1 is applied to the power supply of an insulation type shown in FIG. 4 that employs a transformer for electric power conversion. In FIG. 1, the component parts corresponding to the counterpart component parts of the conventional circuit (shown in FIG. 5) are designated by the same reference numerals and symbols. Referring now to FIG. 1, input terminal FB is grounded via a resistance circuit consisting of resistors R1 and R2 connected in series to each other. The connection point of resistors R1 and R2 is connected to current comparator 1 exhibiting an overcurrent limiting function and averaging circuit 5. The voltage signal obtained by dividing feedback voltage $V_{FB}$ is fed to the first (−) input terminal of current comparator 1 and averaging circuit 5. Current comparator 1 is a current limiting means that controls the ON-period of switching device Q1 (cf. FIG. 4). The second (−) input terminal of current comparator 1 is connected to first reference voltage supply Vth1. The third (+) input terminal of current comparator 1 is connected to sensing input terminal IS such that voltage signal Vis is fed to the third (+) input terminal of current comparator 1.

The output terminal of current comparator 1 is connected to reset terminal R of flip-flop circuit 2. The output terminal of oscillator circuit (OSC) 3 is connected to set terminal S of flip-flop circuit 2. A short-pulse set signal is inputted from oscillator circuit (OSC) 3 to set terminal S of flip-flop circuit 2 at a predetermined cycle. The output terminal of averaging circuit 5 is connected to the first (+) input terminal of comparator 6 such that the output from averaging circuit 5 is compared with the voltage value of second reference voltage supply Vth2 connected to the second (−) input terminal of comparator 6.

Averaging circuit 5 converts the instantaneous value of the load current to a time-average value. In one preferred embodiment, averaging circuit 5 is configured as an analog circuit that averages the analog signal corresponding to the load current, for example, with a CR filter (low-pass filter) to obtain a current value averaged for a period of time (hereinafter referred to as a "time-averaged current value") and outputs the time-averaged current value. Alternatively, averaging circuit 5 may be configured as an analog calculation circuit that calculates a time-averaged current value from the peak value of an analog signal corresponding to the load current, and inputted thereto. The analog calculation circuit is realized by combining a subtraction circuit, which subtracts the reference value set therein from the peak value utilizing an operational amplifier, and an integrating circuit.

Comparator 6 sets the output signal therefrom at a high level (hereinafter referred to an "H-level" or simply as an "H") when the output voltage value from averaging circuit 5 is larger than the voltage value of second reference voltage supply Vth2. Comparator 6 constitutes a protecting means that detects the overloaded state or the overcurrent state of the load connected to the power supply. The output terminal of comparator 6 is connected to latch circuit 8 via delay circuit 7.

In the control IC according to a preferred embodiment of the invention, first reference voltage supply Vth1 provides the current limiting means (current comparator 1) with a specific detection level. The voltage value of first reference voltage supply Vth1 is set to be higher than the voltage value of second reference voltage supply Vth2 that provides the protecting means against an overload or an overcurrent (comparator 6) with a specific detection level.

Delay circuit 7 delays the high (H) level detection signal outputted from comparator 6 for a predetermined period and outputs the delayed detection signal to latch circuit 8. Delay circuit 7 is reset as the output signal from comparator 6 is set at the low (L) level. Latch circuit 8 is started only when the high (H) level detection signal is outputted continuously from comparator 6 for a predetermined period. This operation sets the delay time until the switching operation of the switching device Q1 (cf. in FIG. 4) is stopped to prevent malfunctions caused by noise and such factors from occurring. The output from latch circuit 8 is connected to the first input terminal of AND gate 10. After latch circuit 8 is started, the first input terminal of AND gate 10 is set at the L level such that the Q-signal outputted from flip-flop 2 is latched for a predetermined period. The Q-signal outputted from flip-flop 2 is the input signal to the second input terminal of AND gate 10. The output signal from AND gate 10 is subjected to impedance conversion in buffer circuit 4. The output signal from AND gate 10, the impedance of which is converted, is outputted from output terminal OUT as the switching signal for switching device Q1, e.g. a power MOSFET connected externally to the control IC.

The operation of the switching power supply controlled by the control IC will now be described below. While the power supply is conducting the usual operation, the divided voltage signal obtained by dividing feedback voltage $V_{FB}$ fed from input terminal FB is lower than the voltage value of first reference voltage supply Vth1. The divided voltage signal is inputted to averaging circuit 5 and current comparator 1. Hence, current comparator 1 compares the divided voltage signal with voltage signal Vis from sensing input terminal IS to determine the width of the PWM pulse fed to output terminal OUT.

The divided voltage signal obtained by dividing feedback voltage $V_{FB}$ is an index of the peak current flowing through switching device Q1 during a certain switching cycle due to the following reason. At a specific value of drain-source current Ids, the voltage signal Vis fed to sensing input terminal IS is equal to the divided voltage signal of feedback voltage $V_{FB}$. When drain-source current Ids flowing through switching device Q1 increases to this specific value, switching device Q1 is turned off. The current at turning off of switching device Q1 is the maximum drain-source current Ids, that is the peak current. Therefore, when the divided voltage signal of feedback voltage $V_{FB}$ is higher than the voltage value of first reference voltage supply Vth1, the voltage value of first reference voltage supply Vth1 for current comparator 1 provides a reference value for the peak current limiting function in the power supply of the pulse-by-pulse type.

The signal obtained by averaging the divided voltage signal of feedback voltage $V_{FB}$ is inputted to comparator 6 constituting the protecting means against an overload or an overcurrent. Therefore, the voltage value of second reference voltage supply Vth2 for comparator 6 provides a reference value for the protection function against an over average current. The result of comparing the signal obtained by averaging the divided voltage signal of feedback voltage $V_{FB}$ with the voltage of second reference voltage supply Vth2 of comparator 6 is inputted to delay circuit 7.

When averaging circuit 5 outputs a voltage signal higher than the voltage value of second reference voltage supply Vth2, it is judged that the average current flowing through the load is in the overcurrent state and the operation of delay circuit 7 is started. When averaging circuit 5 outputs a voltage signal lower than the voltage value of second reference voltage supply Vth2, it is judged that the average current flowing through the load is not in the overcurrent state and the operation of delay circuit 7 is reset.

When a set period of time has elapsed after starting the delay circuit 7, it is judged that an abnormal state is caused in the load circuit, and latch circuit 8 is made to operate to stop sending the switching signal to switching device Q1.

The voltage value of first reference voltage supply Vth1 is set to be higher than the voltage value of second reference voltage supply Vth2. It is therefore possible to latch switching device Q1 to stop the switching operation thereof when the overcurrent state of the average current continues for a certain period. In some cases, a peak current, higher than the average current but having a voltage signal lower than the voltage value of first reference voltage supply Vth1, may flow. By virtue of the setting described above, it is also possible not to stop sending the switching signal even when the peak current as described above flows for the certain period. In other words, it is allowed to make a current higher than the reference value for the average current flow instantaneously. The peak current is limited by detecting the current value thereof in every switching cycle. Therefore, a too-high peak current is prevented from flowing by making the current limiting function work in advance to the protection function even within the above-described certain period. The too-high peak current is prevented from flowing when the voltage signal thereof is higher than the voltage value of first reference voltage supply Vth1.

The power supply according to the first embodiment has been described so far in connection with the control IC that carries out current mode control (hereinafter referred to as "CMC"). CMC stabilizes the output voltage by performing duty control of switching device Q1 utilizing the variation of the current flowing through an inductor (that is, voltage signal Vis proportional to drain-source current Ids of switching device Q1). Although not described in detail herein, the invention is applicable to power supplies employing voltage mode control (hereinafter referred to as a "VMC"). VMC stabilizes the output voltage by performing duty control of switching device Q1 based on the control signal, to which a part of the output voltage is fed back.

As described above, the power supply that employs the control IC according to the first embodiment also facilitates setting the respective limit values for the average current and the peak current when the power supply is connected to a load such as an inductive load that causes a large difference between the average current and peak current. Such a power supply that employs the control IC according to the first embodiment also facilitates turning off switching device Q1 when the instantaneous value of the current flowing through switching device Q1 exceeds the first reference value (Vth1). This power supply facilitates also judging that the load is in the overloaded state or in the overcurrent state when the time-averaged value of the load current exceeds the second reference value (Vth2), and stopping the switching operation of switching device Q1 for a certain period.

As the power supply according to the first embodiment is configured such that the time-averaged load current value is detected in the control IC, it is not necessary to add any average current detection circuit nor any averaging circuit externally. Therefore, the power supply according to the first embodiment has a reduced number of component parts, smaller volume, and lower manufacturing costs. The control IC for controlling the power supply according to the first embodiment facilitates limiting the peak current and performing the protection function against the over average current.

Second Embodiment

Figure 2:
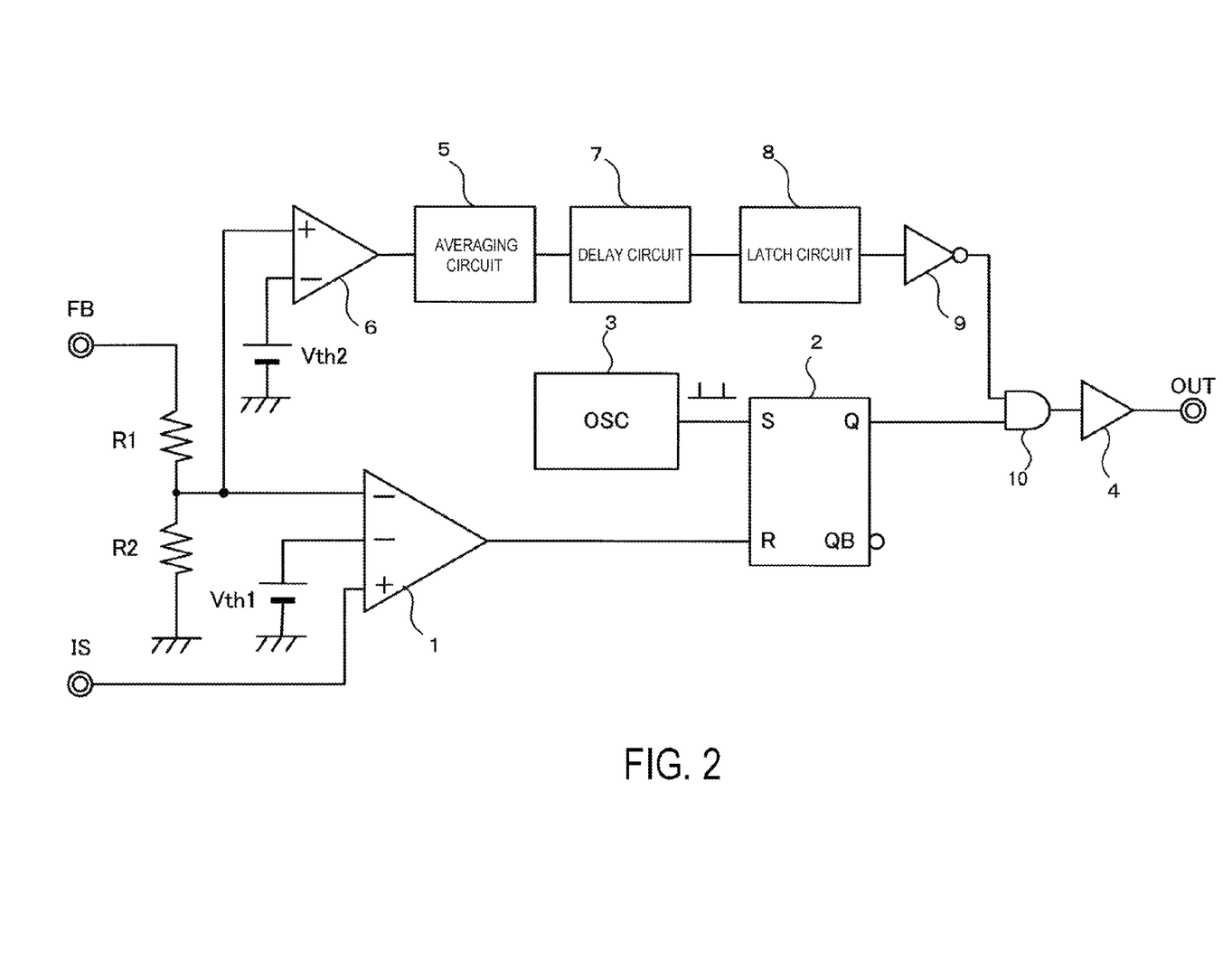
FIG. 2 is a block circuit diagram of a control IC for controlling a switching power supply according to a second embodiment of the invention.

FIG. 2 is a block circuit diagram of a control IC for controlling a switching power supply according to a second embodiment of the invention.

The control IC shown in FIG. 2 is applied to the power supply of an insulation type shown in FIG. 4 that employs a transformer for electric power conversion. In FIG. 2, the component parts corresponding to the counterpart component parts of the conventional circuit (cf. FIG. 5) are designated by the same reference numerals and symbols and their detailed descriptions are omitted for the sake of simplicity and clarity. The control IC according to the second embodiment is different from the control IC according to the first embodiment in that comparator 6 that compares the divided voltage signal of feedback voltage $V_{FB}$ with the voltage value of second reference voltage supply Vth2 is disposed in the first stage of averaging circuit 5 in the control IC according to the second embodiment.

Averaging circuit 5 shown in FIG. 2 is configured as a logic circuit that generates a signal corresponding to the time-averaged current value from the analog signal corresponding to the load current. The logic circuit is configured as an up/down counter. The up/down counter counts up the pulses with a predetermined cycle when the output from comparator 6 is at the high (H) level. The up/down counter counts down the pulses when the output from comparator 6 is at the low (L) level. The counting down by the counter is stopped preferably when all the count bits on the counter are 0. The counting up by the counter is stopped preferably when all the count bits on the counter are 1. It is preferable to judge that the average load current has reached the predetermined current value when the counted value on the counter is the predetermined one. Alternatively, the logic circuit may be configured as a charge pump circuit used for a phase-locked loop circuit (PLL circuit). In a further alternative, an analog low-pass filter may be used in substitution for the logic circuit.

Third Embodiment

Figure 3:
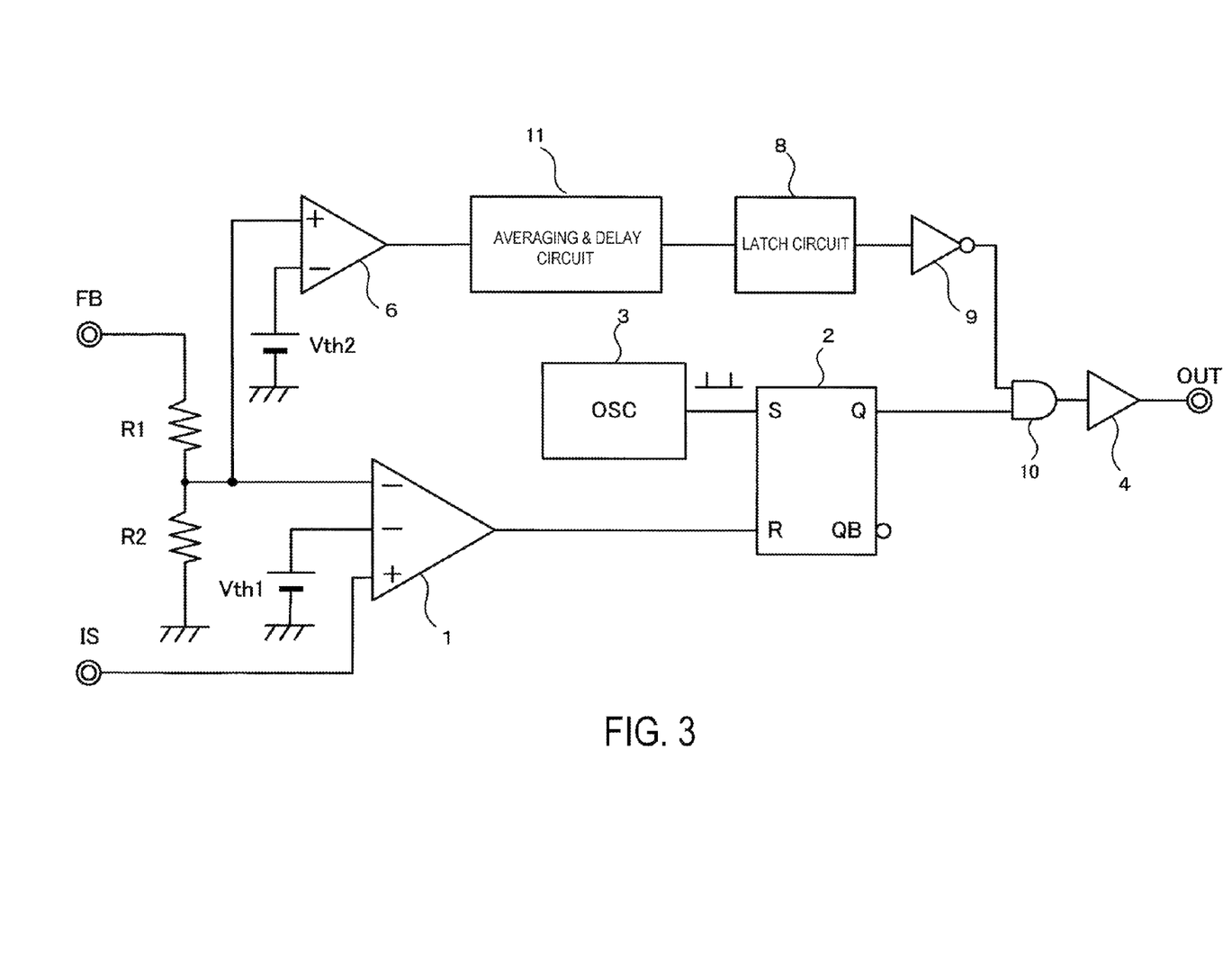
FIG. 3 is a block circuit diagram of a control IC for controlling a switching power supply according to a third embodiment of the invention.

FIG. 3 is a block circuit diagram of a control IC for controlling a switching power supply according to a third embodiment of the invention.

In the control IC according to the third embodiment, averaging and delay circuit 11 is used in substitution for averaging circuit 5 and delay circuit 7. Averaging and delay circuit 11 integrates averaging circuit 5 and delay circuit 7 according to the second embodiment into a unit. Averaging and delay circuit 11 is configured by employing the logic circuit described in connection with the second embodiment. As the other circuit elements are configured in the same manner as those according to the first and second embodiments, detailed descriptions of the configurations and operations thereof are omitted for the sake of simplicity and clarity.

Although the control ICs according to the first through third embodiments are described in connection with a power supply exhibiting a latch-type protection function against an over average current, the invention is applicable to control ICs for controlling switching power supplies of the so-called automatic-recovery-type that automatically resume operating after stopping the switching operation for a predetermined period.

What is claimed is:

1. An integrated control circuit controlling a switching power supply, the integrated control circuit configured to control a switching device connected to a transformer primary winding to conduct a switching operation for feeding predetermined electric power from a transformer secondary winding to a load, the integrated control circuit comprising:
   a current limiter configured to detect a current flowing through the switching device in every switching cycle for controlling an ON-period of the switching device;
   a protection circuit configured to protect against an overload or an overcurrent, including to detect, from a load current flowing through the load, an overcurrent state of the load or an overloaded state of the load, and to stop the switching operation of the switching device for a predetermined period of time in response thereto; and
   a delay device configured to set a delay time before stopping the switching operation from a time when the overcurrent state or the overloaded state of the load is detected, wherein
   a first detection level is used in the current limiter;
   a second detection level is used in the protection circuit; and
   the first detection level is set to be higher than the second detection level.

2. The integrated control circuit according to claim 1, wherein
   the current limiter is configured to limit the switching operation of the switching device for a certain period when the current flowing through the switching device exceeds the first detection level;
   the protection circuit is configured to judge that the load is in the overloaded state or in the overcurrent state when a time average value of the load current exceeds the second detection level.

3. The integrated control circuit according to claim 1, wherein
   the protection circuit comprises a judging circuit configured to judge that the load is in the overloaded state or in the overcurrent state based on a detection signal generated based on an output voltage to the load and fed back to a primary side of the of the transformer.

4. The integrated control circuit according to claim 1, wherein the protection circuit comprises an averaging circuit configured to convert an instantaneous value of the load current to a time average value of the load current.

5. The integrated control circuit according to claim 4, wherein the averaging circuit comprises an analog circuit configured to average an analog signal corresponding to the load current with a CR filter and to output the time average value of the load current.

6. The integrated control circuit according to claim 4, wherein the averaging circuit comprises an analog calculating circuit configured to calculate the time average value of the load current from a peak value of an analog signal inputted thereto and corresponding to the load current.

7. The integrated control circuit according to claim 4, wherein the averaging circuit comprises a logic circuit configured to generate a signal corresponding to the time average value of the load current from an analog signal corresponding to the load current.

8. The integrated control circuit according to claim 4, wherein the averaging circuit comprises a pulse generating circuit configured to generate pulses with a predetermined cycle and a counter circuit configured to count, based on the pulses, a period, for which an analog signal corresponding to the load current exceeds a predetermined value, to calculate the time average value of the load current.

9. A switching power supply with an integrated control circuit that controls a switching device connected to a transformer primary winding to perform a switching operation, the switching power supply feeding predetermined electric power from a transformer secondary winding to a load, the integrated control circuit comprising:
 a current limiter configured to detect a current flowing through the switching device in every switching cycle to control an ON-period of the switching device;
 a protection circuit configured to protect against an overload or an overcurrent, including to detect, from a load current flowing through the load, an overcurrent state of the load or an overloaded state of the load and to stop the switching operation for a predetermined period of time in response thereto; and
 a delay device configured to set a delay time before stopping the switching operation after detection of the overcurrent state or the overloaded state, wherein
  a first detection level is used in the current limiting means;
  a second detection level is used in the protecting means; and
  the first detection level is set to be higher than the second detection level.

10. A method for controlling a switching power supply, in which a switching device connected to a transformer primary winding performs a switching operation for feeding predetermined electric power from a transformer secondary winding to a load, the method comprising the steps of:
 detecting a current flowing through the switching device in every switching cycle to control an ON-period of the switching device;
 detecting, from a load current flowing through the load, an overcurrent state of the load or an overloaded state of the load and stopping the switching operation of the switching device for a predetermined period of time in response thereto; and
 setting a delay time from said detecting the overcurrent state or the overloaded state to said stopping the switching operation; wherein the step of detecting a current flowing through the switching device includes setting a first detection level and the step of detecting an overcurrent state of the load or an overloaded state of the load includes setting a second detection level, and wherein the first detection level is higher than the second detection level.

11. The method according to claim 10, further comprising:
 limiting the switching operation of the switching device for a certain period when the current flowing through the switching device exceeds the first detection level;
 judging that the load is in the overloaded state or in the overcurrent state when a time average value of the load current exceeds the second detection level.

12. The method according to claim 10, wherein said judging that the load is in the overloaded state or in the overcurrent state is based on a detection signal generated based on an output voltage to the load and fed back to a primary side of the transformer.

13. The method according to claim 10, wherein detecting the overcurrent state or the overloaded state further comprises converting an instantaneous value of the load current to a time average value of the load current.

14. The method according to claim 13, wherein the converting further comprises averaging an analog signal corresponding to the load current with a CR filter and outputting the time average value of the load current.

15. The method according to claim 13, wherein the converting further comprises calculating the time average value of the load current from a peak value of an analog signal inputted thereto and corresponding to the load current.

16. The method according to claim 13, wherein the converting further comprises generating a signal corresponding to the time average value of the load current from an analog signal corresponding to the load current.

17. The method according to claim 13, wherein the converting further comprises generating pulses with a predetermined cycle and counting based on the pulses a period, for which an analog signal corresponding to the load current exceeds a predetermined value to a higher side, to calculate the time average value of the load current.

* * * * *